United States Patent [19]
Shinohara

[11] Patent Number: 5,363,380
[45] Date of Patent: Nov. 8, 1994

[54] DATA PROCESSING DEVICE WITH TEST CONTROL CIRCUIT

[75] Inventor: Makoto Shinohara, Kawasaki, Japan

[73] Assignee: Kabushiki Kaisha Toshiba, Kawasaki, Japan

[21] Appl. No.: 692,650

[22] Filed: Apr. 29, 1991

[30] Foreign Application Priority Data

May 16, 1990 [JP] Japan .................. 2-124037

[51] Int. Cl.$^5$ .............................. G06F 11/00
[52] U.S. Cl. .................. 371/16.1; 395/575
[58] Field of Search ............... 395/575, 375; 371/16.1, 371/15.1; 364/200, 229.4

[56] References Cited

U.S. PATENT DOCUMENTS

| 3,921,142 | 11/1975 | Bryant et al. | 364/737 |
| 4,334,268 | 6/1982 | Boney et al. | 395/375 |
| 4,654,804 | 3/1987 | Thaden et al. | 364/200 |
| 4,878,168 | 10/1989 | Johnson et al. | 364/200 |
| 4,967,387 | 10/1990 | Shibasaki | 371/16.1 |
| 5,032,783 | 7/1991 | Hwang et al. | 371/25.1 |
| 5,142,536 | 8/1992 | Akao et al. | 371/18 |
| 5,250,895 | 10/1993 | Harigai . | |

FOREIGN PATENT DOCUMENTS 0158774 10/1985 European Pat. Off. .

OTHER PUBLICATIONS

Self-Contained Diagnostic Analyzer for Multimicroprocessor System, Regehr et al., IBM Technical Disclosure Bulletin, vol. 23, No. 2, Jul. 1980, whole document.
Session VIII: Microprocessors-Design Methodology, Braune et al., I.E.E.E. Solid-State Circuits Conference 30 (1987) Feb., First Edition, New York, N.Y., USA, vol. 30, pp. 90-91.
Design for Testability for Microprocessor-Based Boards, R. Willis, Electronic Engineering Apr. 1983, vol. 56, No. 676, pp. 67, 68, 69, 72.

Primary Examiner—Hoa T. Nguyen
Assistant Examiner—Albert Decady
Attorney, Agent, or Firm—Foley & Lardner

[57] ABSTRACT

Disclosed is a data processing device with a test control circuit comprising a CPU, peripheral devices such as a ROM, a RAM, and the like, an address bus through which the CPU is connected to the peripheral devices, an input/output circuit as an interface circuit for controlling transfer of data input/output and an address signal between the address bus and the data bus and an external device, and a control circuit incorporated in the data processing device for isolating the address bus and the data bus from the CPU in a test mode of the device and for controlling the input/output operations for the peripheral devices, the operation of the input/output control circuit, and the operation of the CPU.

5 Claims, 12 Drawing Sheets

| FIG.5A |
|---|
| FIG.5B |

READOUT OPERATION FOR ONE BYTE DATA

| | | PRIOR ART TEST VECTOR | | PRESENT INVENTION (PERIPHERAL TESTING MODE) TEST VECTOR | | PRESENT INVENTION (MEMORY TESTING MODE) TEST VECTOR | |
|---|---|---|---|---|---|---|---|
| | | ADDRESS | DATA | ADDRESS | DATA | ADDRESS | DATA |
| BUS OPERATION | 1 | INSTRUCTION CODE ADDRESS | INSTRUCTION CODE (I/O$_3$→CPU) | I/O$_3$ ADDRESS | I/O$_3$ OUTPUT DATA | | I/O$_3$ OUTPUT DATA |
| | 2 | OPERAND ADDRESS | OPERAND | | | | |
| | 3 | OPERAND DATA ADDRESS | OPERAND DATA | | | | |
| | 4 | INSTRUCTION CODE ADDRESS | INSTRUCTION CODE (CPU→I/O$_4$) | | | | |
| | 5 | OPERAND ADDRESS | OPERAND | | | | |
| | 6 | OPERAND DATA ADDRESS | OUTPUT DATA | | | | |
| TEST VECTOR | | 6 | | 1 | | 0.5 | |
| TEST TIME | | 6 | | 1 | | 1 | |

FIG.5B

WRITING OPERATION FOR ONE BYTE DATA

| BUS OPERATION | | ADDRESS | DATA | ADDRESS | DATA | ADDRESS | DATA |
|---|---|---|---|---|---|---|---|
| 1 | | INSTRUCTION CODE ADDRESS | INSTRUCTION CODE (I/O 4→CPU) | I/O 3 ADDRESS | I/O 3 INPUT DATA | | I/O 3 INPUT DATA |
| 2 | | OPERAND ADDRESS | OPERAND | | | | |
| 3 | | INSTRUCTION CODE ADDRESS | INSTRUCTION CODE (CPU→I/O 3) | | | | |
| 4 | | OPERAND ADDRESS | OPERAND | | | | |
| 5 | | OPERAND DATA ADDRESS | INPUT DATA | | | | |
| TEST VECTOR | | 5 | | 1 | | 0.5 | |
| TEST TIME | | 5 | | 1 | | 1 | |

| IOM1 | IOM0 | RD | WD | USE OF ADDRESS BUS | USE OF DATA BUS | SIGNAL | PB OPERATION | PA OPERATION | ADDRESS OUTPUT PA | ADDRESS OUTPUT PB | IRI |
|---|---|---|---|---|---|---|---|---|---|---|---|
| 1 | 0 | INPUT | INPUT | | | | | | | | |
| | | 0 | 1 | CPU | I/O | R | (ODD) DATA OUTPUT | (EVEN) DATA OUTPUT | NONE | NONE | NOP |
| | | 0 | 1 | CPU | (ODD) PB /(EVEN) PA | R | AL OUTPUT/(ODD) DATA INPUT | AH OUTPUT/ (EVEN) DATA INPUT | PRESENT | PRESENT | DB |
| | | 1 | 0 | CPU | (ODD) PB /(EVEN) PA | W | (ODD) DATA INPUT | (EVEN) DATA INPUT | NONE | NONE | NOP |
| | | 0 | 0 | CPU | I/O | R | AL OUTPUT/(ODD) DATA OUTPUT | AH OUTPUT/ (EVEN) DATA OUTPUT | PRESENT | PRESENT | JMP |
| 0 | 0 | 1 | 1 | PA/PB LATCH | I/O | R | AL INPUT/ DB OUTPUT | ADDRESS (HIGH) INPUT | NONE | NONE | NOP |
| | | 0 | 1 | PA/PB LATCH | PB | R | AL INPUT/ DB OUTPUT | ADDRESS (HIGH) INPUT | NONE | NONE | DB |
| | | 1 | 0 | PA/PB LATCH | PB | W | AL INPUT/ DB OUTPUT | ADDRESS (HIGH) INPUT | NONE | NONE | NOP |
| | | 0 | 0 | PA/PB LATCH | I/O | R | AL INPUT/ DB OUTPUT | ADDRESS (HIGH) INPUT | NONE | NONE | JMP |
| 1 | 1 | OUTPUT | OUTPUT | | | | NORMAL OPERATION LIKE PRIOR ART | | | | |

DATA PROCESSING DEVICE WITH TEST CONTROL CIRCUIT

BACKGROUND OF THE INVENTION

1. Field of the Invention

The present invention relates to a data processing device with a test control circuit which is capable of efficiently executing a function test for an I/O device such as a Read Only Memory (ROM), Random Access Memory, and other elements incorporated in an one-chip microcomputer.

2. Description of the Prior Art

Figure 1:
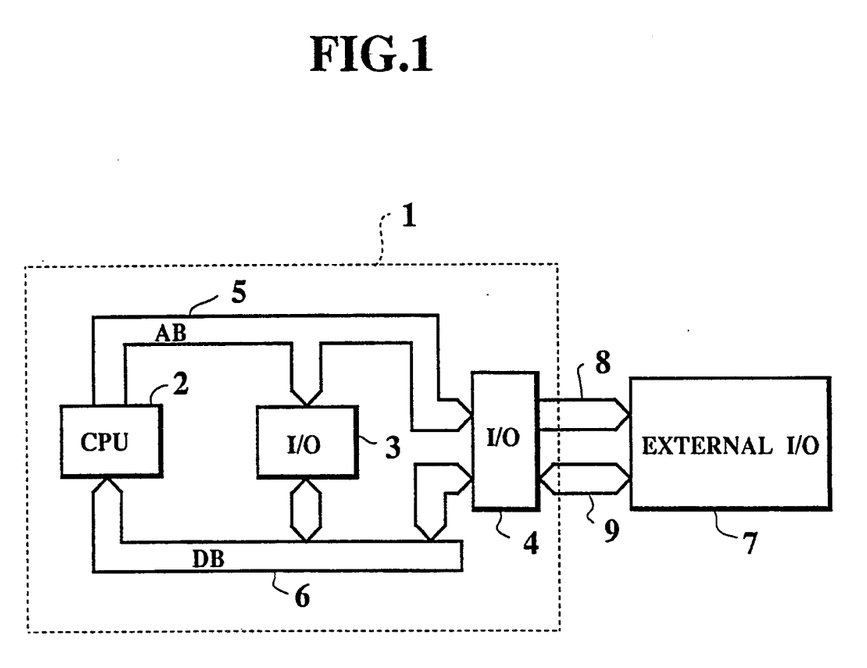
FIG. 1 is a block diagram of a conventional data processing device.

FIG. 1 is a block diagram of a single chip microcomputer 1 in which a central processing unit (CPU) 2 as a main control unit, a random access memory (RAM) 3, a read only memory (ROM) 3, and other elements are incorporated in one chip.

In the same diagram, the single chip microcomputer 1 comprises the CPU 2, and peripheral devices 3 and 4 in addition to the CPU 2 (hereinafter referred to as I/O devices) which are connected through an address bus (AB) 5 and a data bus (DB) 6, fabricated from the one semiconductor chip.

The microcomputer, for example, is connected to an external I/O device 7 to extend the functions thereof.

In this case, the external I/O device 7 is connected to the I/O device 4, which is capable of acting as an interface circuit through the address and data buses 8 and 9 in the microcomputer 1.

Figure 2A:
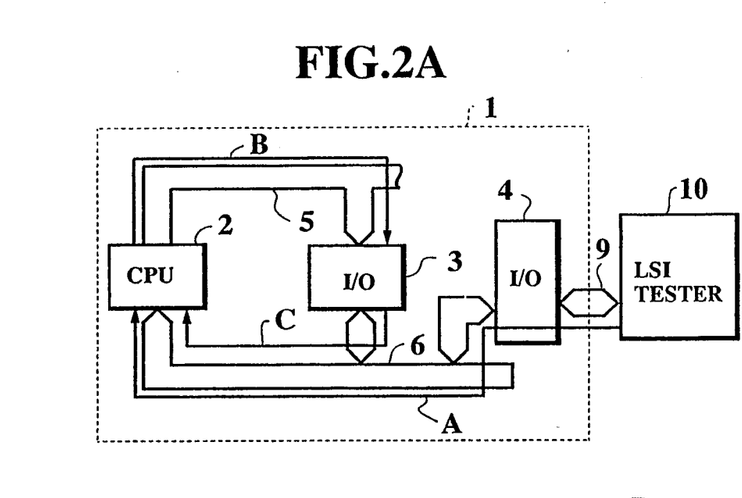
FIGS. 2A to 2C are block diagrams to explain test operations of the data processing device as shown in FIG. 1.

When test operations, function tests, trouble shooting, and analysis of faulty units for the I/O device are executed under the control of a LSI tester 10 (as shown in FIG. 2A) the device of the present invention acts as a testing system which is connected to the microcomputer 1 through a bus 9.

For example, the test operations are carried out as follows:

First, the LSI tester 10 transfers an instruction for the test operation to the CPU 2 through a path A.

Second, the CPU 2 transfers a target address to the I/O device 3 as the target device for the test operation through a path B.

Third, the contents of the I/O device 3 are read out to a register (not shown) in the CPU 2 through a path C.

Figure 2B:
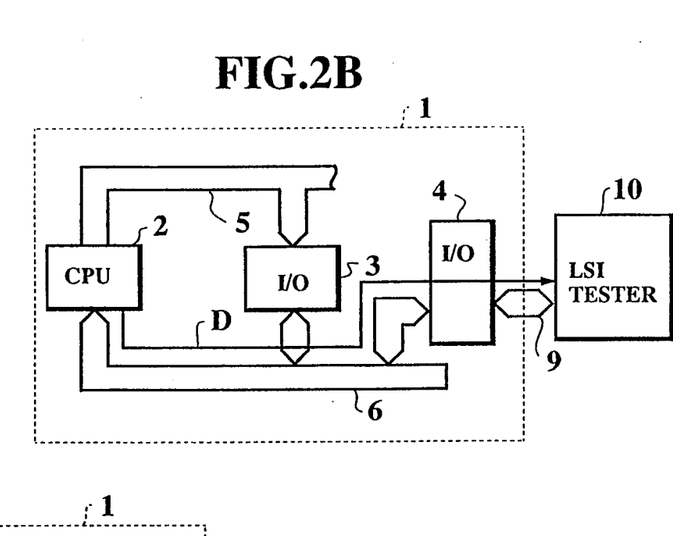
Figure 2C:
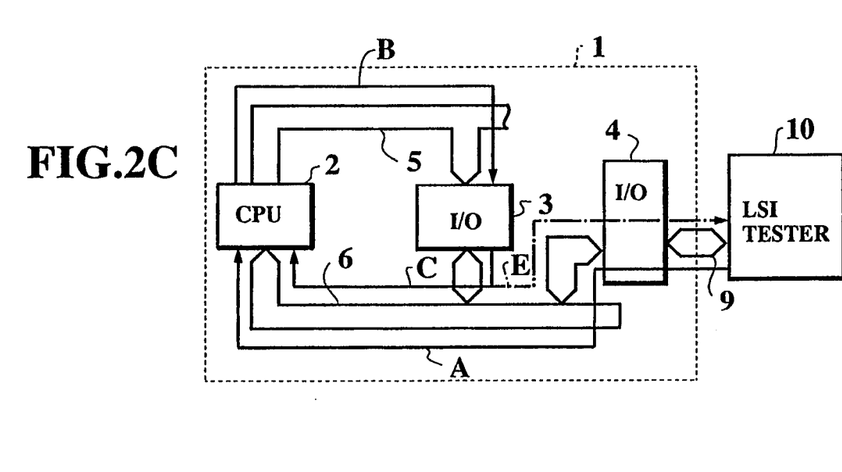

Finally, the contents of the I/O device 3 stored in the register in the CPU 2 are transferred to the LSI tester 10 through a path D, as shown in FIG. 2B, or the contents of the I/O device 3 are directly read out to the LSI tester 10 when they are provided to the CPU 2 through the data bus 6, as shown in FIG. 2C.

Specifically, the readout and other operations for the I/O device 3 as the target device for the test operations are controlled by the instructions provided from the CPU 2.

The CPU 2 must execute a fetch operation to obtain the instructions and the effective address for the test operations, then access the I/O device 3 as the target device when the test operations as described above are carried out under the control of the CPU 2.

However, only the operation to access the I/O device 3 is necessary for the test operation for the I/O device 3. Therefore no fetch operation to obtain the instructions and the effective addresses for the CPU 2 are needed.

No operation time for these fetch operations is required for the test operation.

Moreover, in this case, the many test vectors for the CPU 2 should be transferred from the LSI tester 10 to execute the test operations.

When an I/O device which handles real time information is the target device for the test operation, the information before and after the readout operations of the I/O device must be transferred to the LSI tester 10 for the correct test operations.

In the testing method for I/O devices in a microcomputer in the prior art, when another readout operation for the I/O devices must be carried out immediately after execution of the readout operations, the fetch operations for the instructions and the effective addresses for the CPU, as described above, should be executed between the two readout operations, therefore the LSI tester cannot obtain the information before and after the readout operations of the I/O device.

In such a case, a plurality of test vectors are also required to execute these operations.

As described above, the test operation for the conventional microcomputer takes much time and a plurality of test vectors because an external device such as the LSI tester 10 executes the test operations for the internal I/O devices through the microcomputer.

SUMMARY OF THE INVENTION

An object of the present invention is to solve these problems of the prior art by providing a data processing device with a test control circuit which is capable of reducing the number of test vectors and the testing time for test operations.

A data processing device with a test control circuit according to the present invention comprises a central processing unit (CPU), a plurality of peripheral devices, an address bus and a data bus through which the CPU is connected to the peripheral devices, an input/output control means for controlling transfer of data input/output and an address signal between the address bus and the data bus and an external device, and a test control means for separating the address bus and the data bus from the CPU in a test mode for the device and for controlling the input/output operations of the peripheral devices, the operation of the input/output control means, and the operation of the CPU.

These and other objects, features and advantages of the present invention will be more apparent from the following description of a preferred embodiment, taken in conjunction with the accompanying drawings.

BRIEF DESCRIPTION OF THE DRAWINGS

FIGS. 6C(a-d) are schematic diagram for explaining the input/output at the ports PA and PB in the test operation mode;

DETAILED DESCRIPTION OF THE EMBODIMENTS

A preferred embodiment according to the present invention will now be explained.

Figure 3:
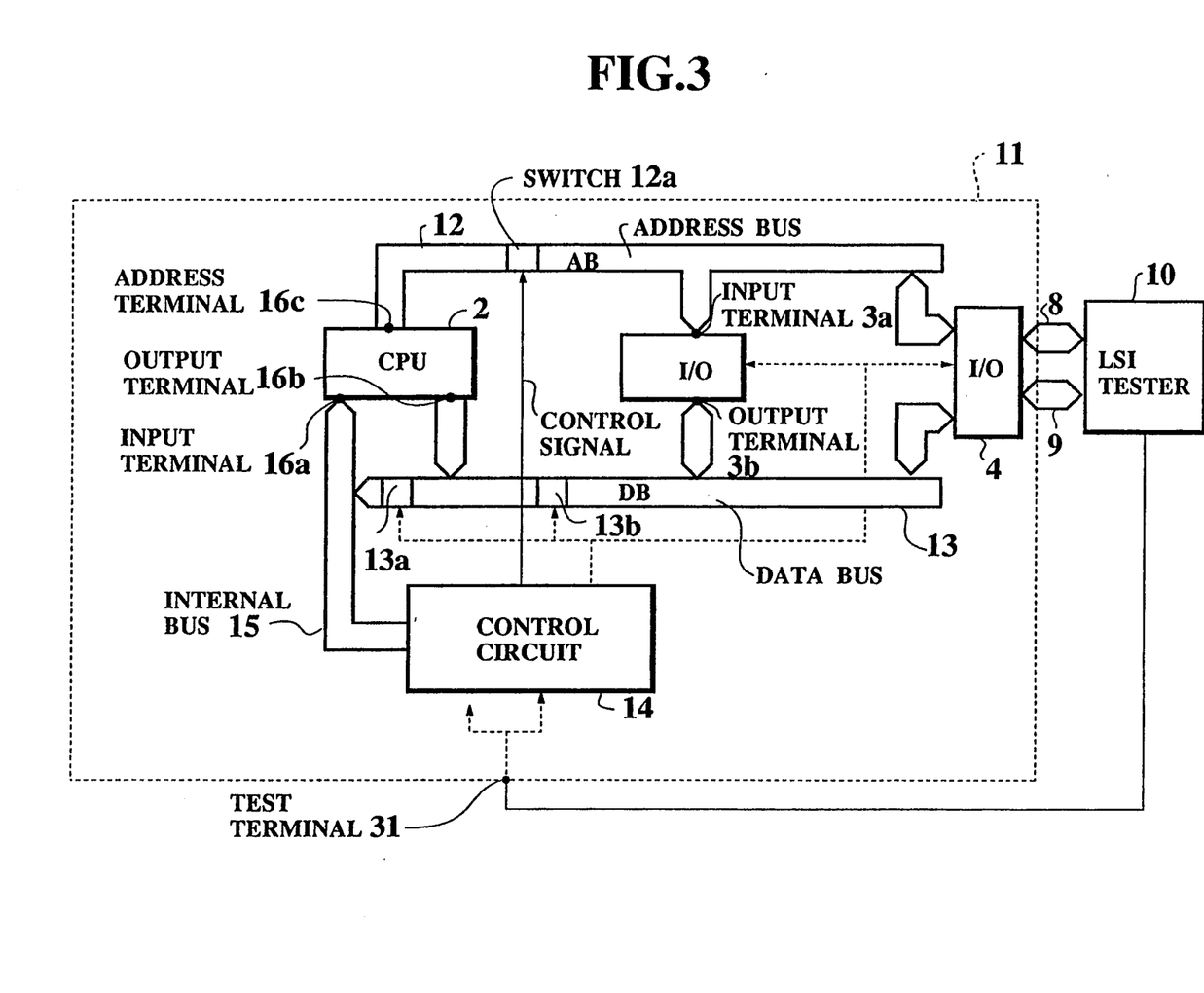
FIG. 3 is a block diagram of a data processing device with a test control circuit according to the present invention.

FIG. 3 is a block diagram illustrating a configuration of a data processing device with a test control circuit according to one aspect of the present invention.

Test operations mainly for testing peripheral elements such as a ROM, a RAM, and the like other than a CPU in a microcomputer fabricated on one chip without control by the CPU by using an external device, for example a LSI tester in the embodiment, are discussed herein. The explanation for the identical elements denoted by the same reference marks in FIGS. 1 and 2A, 2B, and 2C will be omitted in this embodiment.

By integrating the configurations of the microprocessor (or the microcomputer) shown in FIG. 3, the single chip microprocessor 11 in this embodiment further comprises a control circuit 14 as a test control means which is capable of controlling test operations for internal devices such as an I/O device 3, an interface I/O device 4, and the like of a CPU 16, an address bus (AB) 12, and a data bus (DB) 13 when the I/O device 3 is tested by the LSI tester 10 as an external device.

In this embodiment, an address terminal 16C of the CPU 16 is connected to the address bus (AB) 12. Input and output terminals 16a and 16b for instructions and the data thereof are completely separated. The input terminal 16a is connected to an internal bus 15 and the output terminal 16b is joined to the data bus 13. Accordingly, instructions and data provided to the CPU 16 are transferred only through the internal bus 15.

The address bus 12 which joins the CPU 16 to the internal I/O device 3 is disconnected from the CPU 16 by a switch 12a provided in the address bus 12 under control of a control signal provided from the control circuit 14, so that address data provided from the CPU 18 cannot be transferred to the I/O device 3.

The data bus 13 which connects an output terminal of the I/O device 3 and the data output terminal 18b to an I/O device 4 and the internal bus 15 is disconnected from the internal bus 15 by a switch 13a provided in the data bus 13 under control of the control signal-provided from the control circuit 14.

In this condition, no-operation instructions (NOPs) are provided to the CPU 16, so that the CPU 16 only increments an address designated by a program counter (PC) (not shown) incorporated in the CPU 16. No data is transferred to the peripheral devices such as the I/O device 3 by the NOP instruction. Accordingly, the NOP instruction functions to create the same state as when the CPU 16 is disconnected from the I/O device 3.

The control circuit 14 is placed in a test mode, then executes test operation under the control of the LSI tester 10 as the external device. The test mode includes a peripheral test mode and a memory test mode. In the memory test mode, the operations of the ROM, RAM and other memory devices and the contents thereof are tested, and in the peripheral test mode, operations of a timer, a serial input/output device and the like (not shown) are tested. 1 Control signal are transferred to registers IOM1 and IOM0 to set the control circuit 14 to the test mode.

The registers IOM1 and the IOM0 are directly controlled as the external terminals by the LSI tester 10. However, they can be placed as a part of the I/O device 3 to reduce the number of the terminals. The contents of the registers IOM1 and the IOM0 are set easily by the method as shown in FIGS. 2A to 2C.

In this case, it can be controlled that the contents of the registers IOM1 and the IOM0 can not be switched from the normal operation mode to the test mode by using the testing terminal 31 whose level indicates the test mode.

Thereby, a user can not change the control circuit from the normal operation mode to the test mode.

Namely, the control circuit enters a protection mode.

After reset of the registers IOM1 and the IOM0, since the levels of them become "1", the microprocessor 11 enters the normal operation mode.

For example, the microprocessor 11 is placed in the memory test mode when a high level (1 or H) control signal is provided to the register IOM1 and when a low level (0 or L) control signal is transferred to the register IOM0.

The microprocessor 11 is placed in the peripheral test mode when the low level (0 or L) control signal is provided to the register IOM1 and when the high level (1 or H) control signal is transferred to the register IOM0.

The address bus 12 is disconnected from the CPU 18 through the switch 12a when the microprocessor 11 is placed in the peripheral test mode, and the NOP instruction is then provided to the CPU 16 through the internal bus 15 by the control circuit 14.

On the other hand, the CPU 16 is connected to the address bus 12 and the internal bus is disconnected from the data bus 13 through the switch 13a by the control circuit 14 when the microprocessor enters the memory test mode, then the NOP instruction is provided to the CPU 16 through the internal bus 15. The address data incremented by the NOP operation is transferred to the address bus 12.

Moreover, the control circuit 14 inputs a jump (JMP) instruction in an instruction register (IR) (not shown) in the CPU 16 through the internal bus 15.

In addition, the data bus 13 is temporarily connected to the internal bus 15 through a switch 13a by the control circuit 14 to preset any address (a first target address) to be tested in the memory test mode. Thereby, the memory test operation can be executed from any address in the I/O devices.

The control circuit 14 can control the input/output operations of the I/O device 4 as an interface circuit between the address and data buses 12 and 13 in the microprocessor 11 and the external LSI tester 10 in the peripheral test mode, and the input/output operations of the I/O device 3 in the memory test mode, respectively.

Figure 4A:
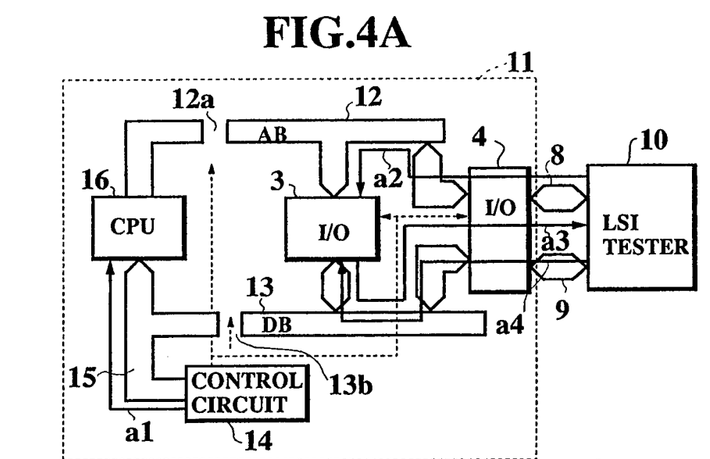
FIGS. 4A to 4C are block diagrams for explaining test operations of the data processing device as shown in FIG. 3.

In the configuration of the microprocessor 11 described above, the address bus 12 is disconnected from the CPU 16 by the control circuit 14 in the peripheral test mode, as shown in FIG. 4A, then the internal bus 15 is also disconnected from the data bus 13. Next, the NOP instruction is provided to the instruction register (IR) (not shown) in the CPU 16 through the internal bus 15 (designated by the path a1 as shown in FIG. 4A).

The contents of the program counter (PC) are incremented by one by the NOP instruction by which the CPU 16 can not execute any effective calculation. The address incremented by the PC is transferred to the address bus 12.

Thus, the operation of the I/O device 4 is controlled by the control circuit in the state in which the address and the data buses 12 and 13 as the internal buses in the microprocessor 11 are disconnected from the CPU 16, the address bus 12 is connected to the LSI tester 10 through the I/O device 4 and an external address bus 8, and the data bus 13 is connected to the LSI tester 10 through the I/O device 4 and an external data bus 9.

An address signal to access the I/O device 3 as a target device to be tested is transferred from the LSI tester 10 to the I/O device 3 through the path a2 as shown in FIG. 4A when the address and data buses 12 and 13 are connected to the LSI tester 10.

In this condition, the contents of the I/O device 3 are read out to the LSI tester 10 for analysis through the data bus 13 in synchronization with a cycle time in the microprocessor 11 when an instruction for readout of the content of the I/O device S is provided to the I/O device by the control circuit 14.

On the other hand, data to be written in is provided from the LSI tester 10 to the I/O device 3 through a path a4 as shown in FIG. 4A when an instruction for writing the data to the I/O device 3 is provided to the I/O device 3 by the control circuit 14.

In the data processing device of the embodiment as described above, the readout and writing operations in the test mode are carried out through the address and data buses 12 and 13 which are connected to the LSI tester 10 and not connected to the CPU 16.

Figure 4B:
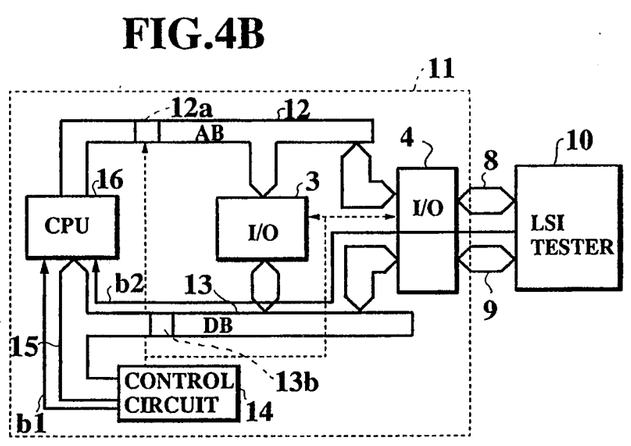

When the I/O device 3 is tested by using the address signals provided continuously, the JMP instruction is set from the control circuit 14 into the instruction register in the CPU 18 through the path b1 as shown in FIG. 4B. Next, the JMP instruction is executed by the CPU 16 to preset an address as operand data which is the effective address of the JMP instruction in the program counter through the path b2 as shown in FIG. 4B.

Figure 4C:
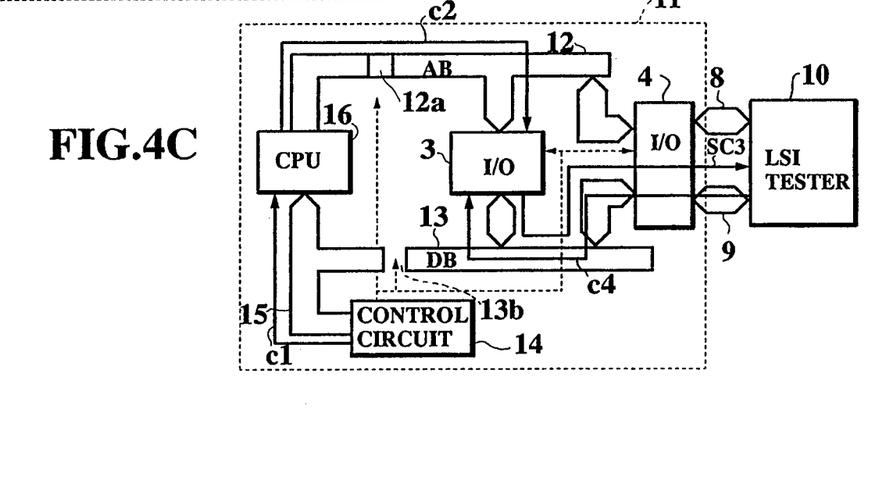

Specifically, when an address signal to be preset in the program counter (PC) is the address signal as the target address of the I/O device 3 to be tested, and the microprocessor enters the memory test mode (the content of the register IOM1 enters the high level (H) and the content of the register IOM0 enters the low level (L)), the NOP instruction is provided from the control circuit 14 to the instruction resister (IR) in the CPU 16 through the internal bus 15 as shown in a path c1 shown in FIG. 4C.

Then, the address signal preset in the program counter (PC) is incremented by one in synchronization with the cycle time of the microprocessor 11, then transferred continuously to the target I/O device 3 to be tested through the address bus 12 which is connected to the CPU 16 as shown by the path C2 in FIG. 4C.

The data transfer operations between the I/O device to be tested and the LSI tester 10 are carried out through the paths C8 and C4 shown in FIG. 4C as the same manner in the peripheral test mode described above.

Thus, the memory device such as the I/O device 3 is tested under the control of the control circuit 14 and the LSI tester 10.

To summarize the test mode in the data processing device according to the present invention described above, address signals for a target I/O device to be tested can not be transferred from the LSI tester 10 to the I/O device. Specifically, the number of test vectors to set addresses of the target I/O device can be reduced by the present invention.

Figure 5A:
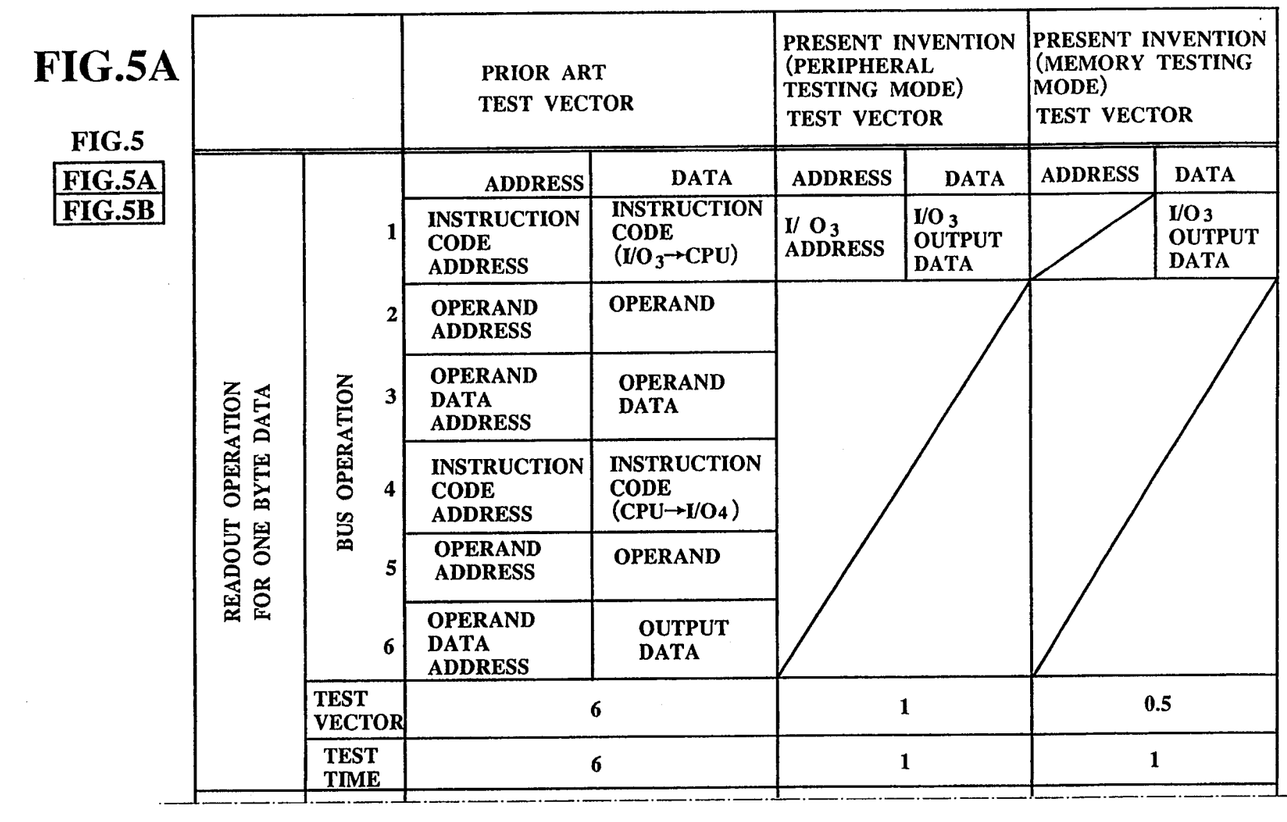
FIGS. 5A and 5B are tables to explain test vectors required for test operations of the data processing devices of the prior art and the present invention as shown in FIGS. 1 and 3.

For example, the data processing device according to the prior art is required to read out six test vectors when one byte in a memory device to be tested is read out to the LSI tester 10, as shown in FIG. 5A. On the other hand, only one test vector is used in the data processing device according to the present invention.

Only the address in a memory circuit to be tested is written in an I/O address field in a test vector for the data processing device of the embodiment.

In particular, only the starting address to be tested may be set in the memory test mode.

In addition, the data output of the I/O means a resultant test vector as a test pattern.

Thus, the test operation time of the data processing device according to the present invention is one sixth (1/6) that of the data processing device according to the prior art.

Figure 5B:
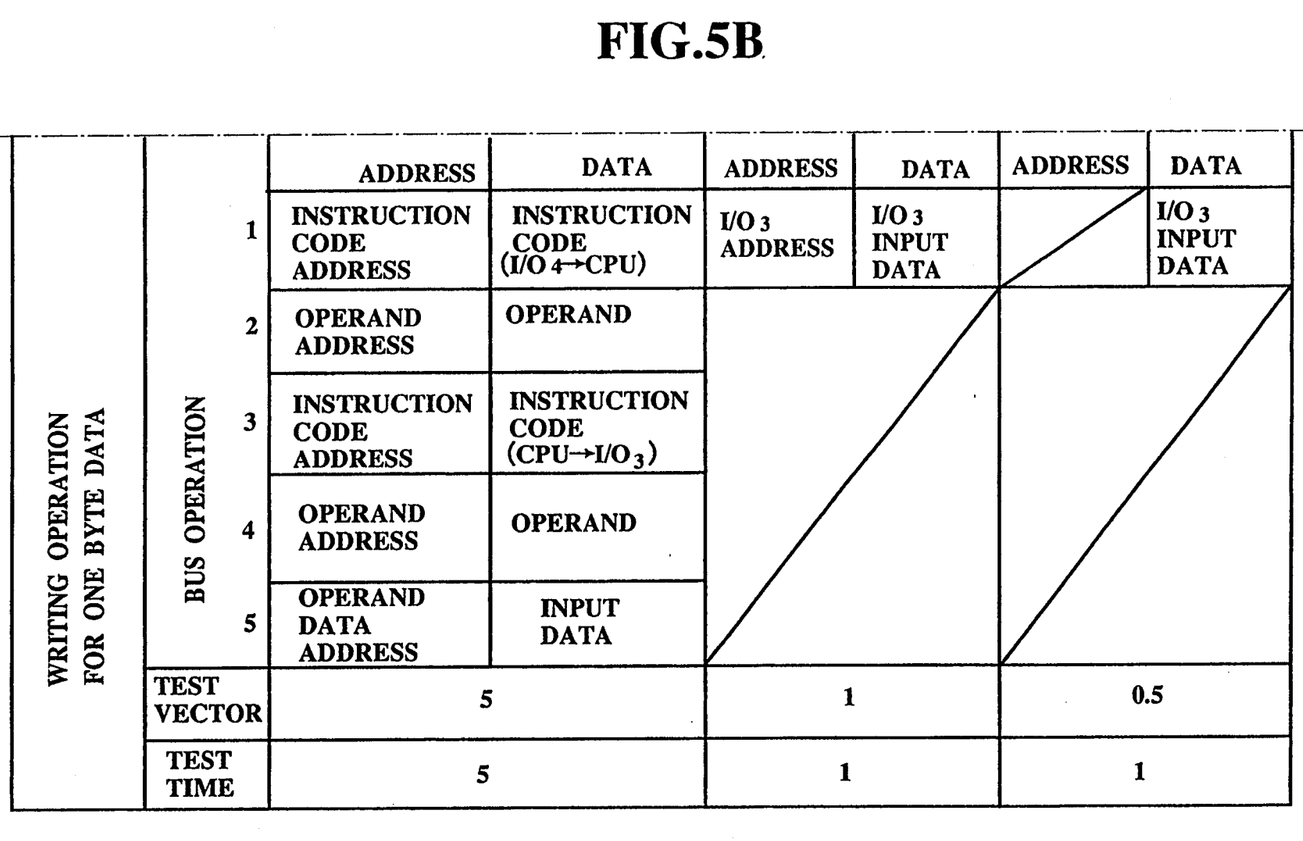

Accordingly, the number of test vectors and the testing time can be greatly reduced by the present invention as shown in FIG. 5A and FIG. 5B because an external LSI tester can test various kinds of I/O devices in a data processing device without the help of a CPU incorporated in the data processing device.

Figure 6A:
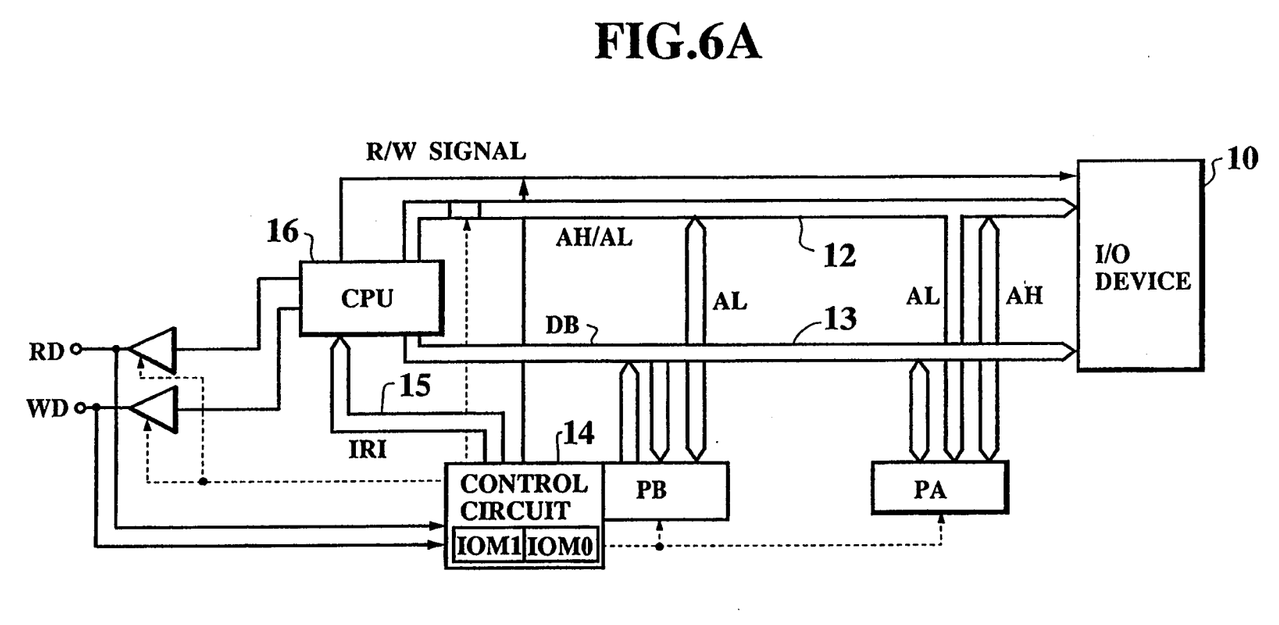
FIG. 6A is a block diagram of parts of the data processing device as shown in FIG. 3.

FIG. 6A is a block diagram of parts of the data processing device as shown in FIG. 3.

Figure 6B:
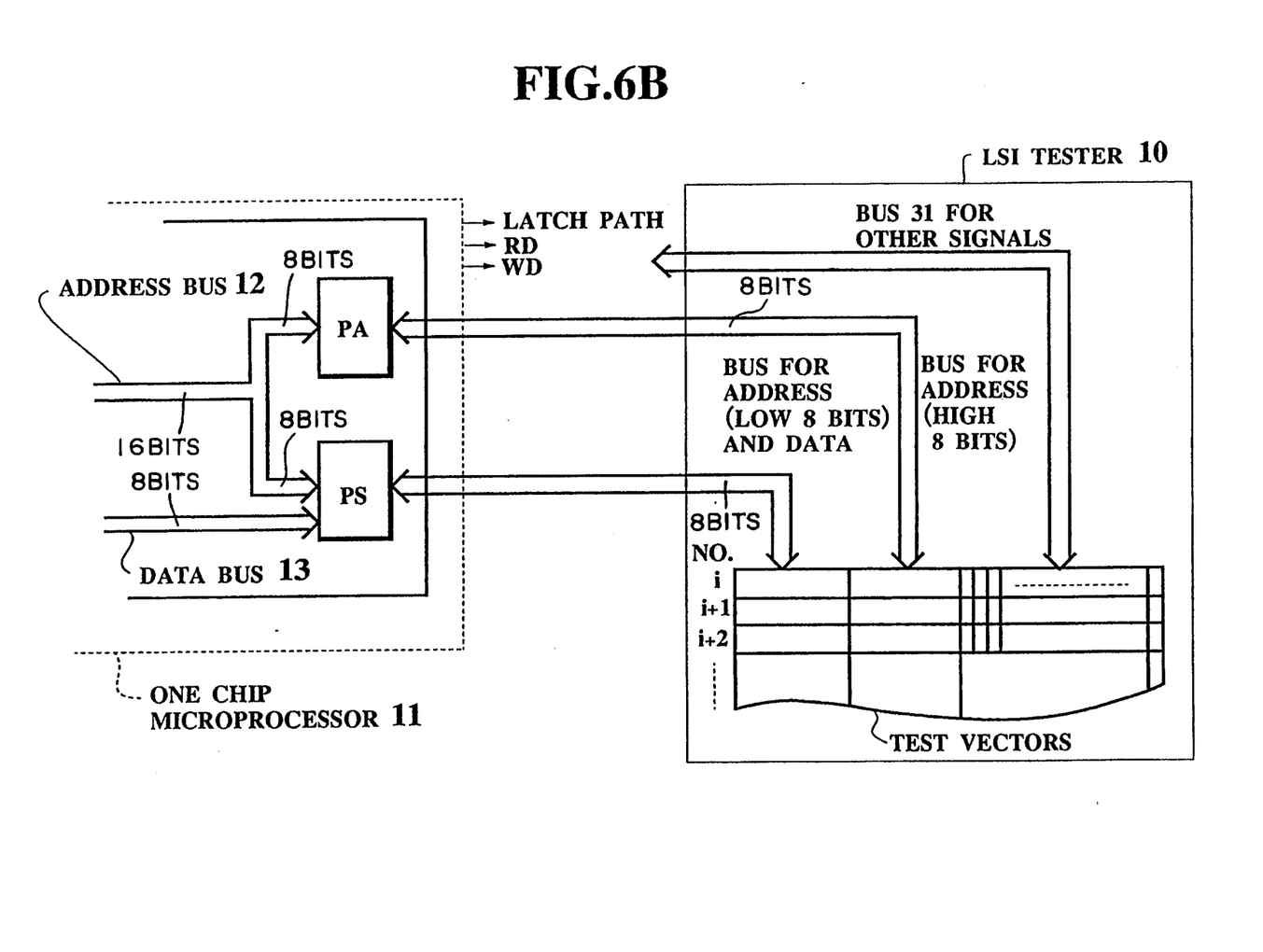
FIG. 6B is a block diagram for explaining the connection between ports PA and PB of the data processing device and a LSI tester in which test vectors are illustrated in detail.
Figure 6C:
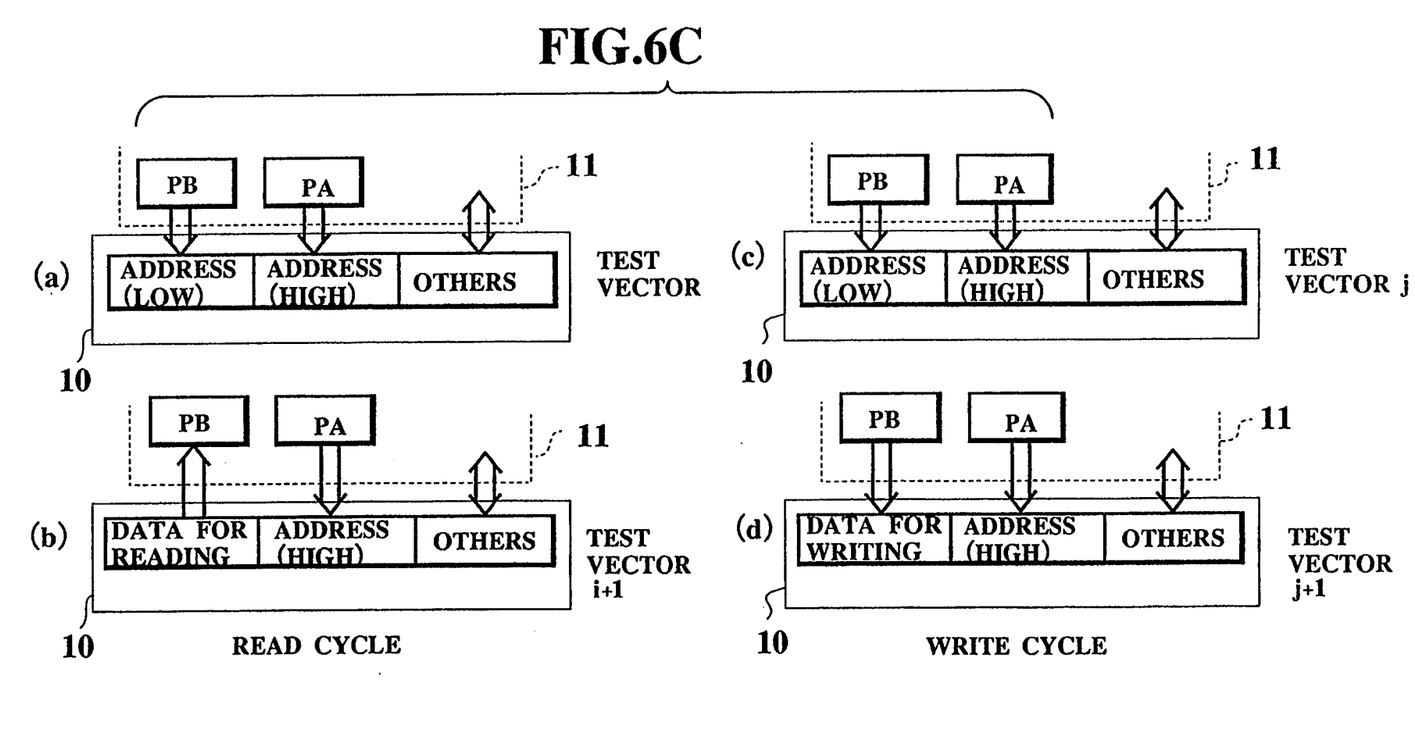

FIG. 6B is a block diagram for explaining the connection between ports PA and PB of the data processing device and a LSI tester in which test vectors are illustrated in detail.

In the same diagrams, the high eight bits in the sixteen bits of the addresses are connected to the port PA in the microprocessor 11, and the low eight bits are connected to the port PB.

Other signals are a reset control signal and test mode setting control signals to be sent to the registers IOM1 and IOM0 of the control circuit 14, and the like.

The CPU 16 can handle eight bits of data and control the input/output operations for the internal I/O device 3 through the terminals RD and WD as external terminals by using read/write (R/W) signals which are included in the other signals.

The LSI tester 10 is connected to the terminals RD and WD to control the read/write operations for the contents of the I/O device 3 incorporated in the microprocessor 11 when the microprocessor enters the test mode.

The address signal of sixteen bits is transferred through the address bus 12. Eight bits of data is transferred through the data bus 13, and an instruction, an effective address, and an effective data are sent through the internal bus 15.

Since the control circuit 14 has two registers, IOM1 and IOM0, the control signals included in the other signals transferred from the LSI tester 10 through the bus 31 (see FIGS. 3 and 6B) are transferred from the LSI tester 10 to the microprocessor 11 through the registers IOM1 and IOM0.

The microprocessor 11 enters the peripheral test mode when both the registers IOM1 and IOM0 are, for example, at the low level "0", and enters the memory test mode when the registers IOM1 and IOM0 are at the high level "1" and the low level "0" respectively and it enters a normal operation mode in which it executes normally when the registers IOM1 and IOM0 are both at the high level "1".

The read/write (R/W) signals are transferred to the I/O device 3 in the test mode, in accordance with the control signals transferred from the LSI tester 10 as the external device, through the terminals RD an WD under the control of the control circuit 14.

For example, a read operation for the I/O device 3 is executed when the high level "1" signal is sent to the terminal WD and a write operation for the I/O device 3 is executed when the low level "0" signal is sent to the terminal WD.

The control circuit 14 controls a connection between the input/output port PB which is placed in the I/O device 4 as an interface circuit and the internal bus 15.

The I/O device 4 as the interface circuit has two input/output terminals PA and PB.

The input/output terminals PA and PB are capable of acting as a parallel port of eight bits for the address signal and data when they are not connected to external I/O device or the like.

On the other hand, when the input/output terminals PA and PB in the microprocessor 11 are connected to the external I/O devices such as the LSI tester 10, and other I/O devices, the input/output terminal port PA inputs and outputs alternately the high 8 bits (AH) or the low 8 bits (AL) of the address signal transferred from the CPU 16, or data transferred through the data bus 13, and the input/output terminal port PB inputs and outputs the low 8 bits (AL) of the address signal transferred from the CPU 16, or data transferred through the data bus 13 under the control of the control circuit 14.

In addition, each port selects either the address signal for the input/output operation or the data.

When two or more items of data, each of eight bits, are, for example, input to each port and one eight-bit item of data is transferred to the port, the other eight bits of data are kept temporarily in the port.

Figure 7:
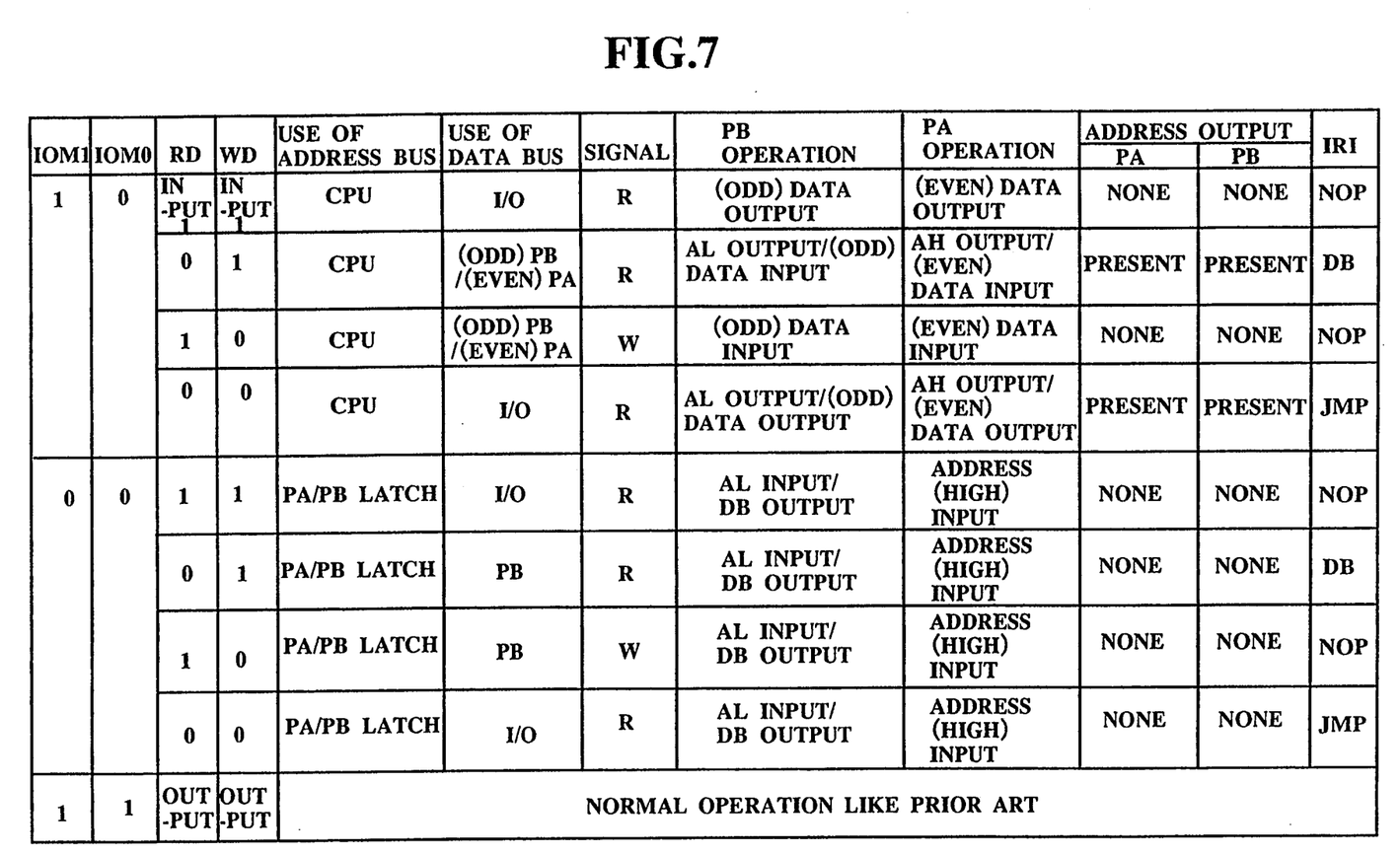
FIG. 7 is a table for explaining data input/output of the data processing device in the test mode according to the present invention.

FIG. 7 is a table for explaining data input/output operations between the LSI tester 10 and the I/O devices in the data processing device 11 with the configuration described above in the test mode and instruction set operations to set instructions such as the NOP instruction, the JMP instruction, and the like in the CPU 16.

For example, when the I/O device to be tested is a memory device incorporated in the microprocessor 11, the data designated by odd address numbers in the memory device is transferred through the port PB between the memory device and the LSI tester 10. On the other hand, the data designated by even address numbers in the memory device is transferred through the port PA between the memory device and the LSI tester 10.

Thus, a test operation for data of two bytes in the memory device can be executed by using only one test vector because the data in the memory device is transferred between the microprocessor 11 and the LSI tester 10 by using two ports, PA and PB.

Accordingly, the number of test vectors to be used in the test mode and the test time of the test operations can be reduced by the data processing device with the test control circuit according to the present invention.

Hereinafter, the reduction of the number of test vectors to be used in the test mode in the data processing device according to the present invention is explained in detail.

In the test operation for the I/O device, the contents of the I/O device 3 are transferred to the CPU 16, then further transferred to the LSI tester 10.

As shown in FIG. 6C, a low address and data are multiplexed (simultaneously transmitted) in the port PB. In this case, two test vectors which are used in a read cycle and a write cycle for the test operations of the I/O device 3 are required in the prior art.

Figure 6D:
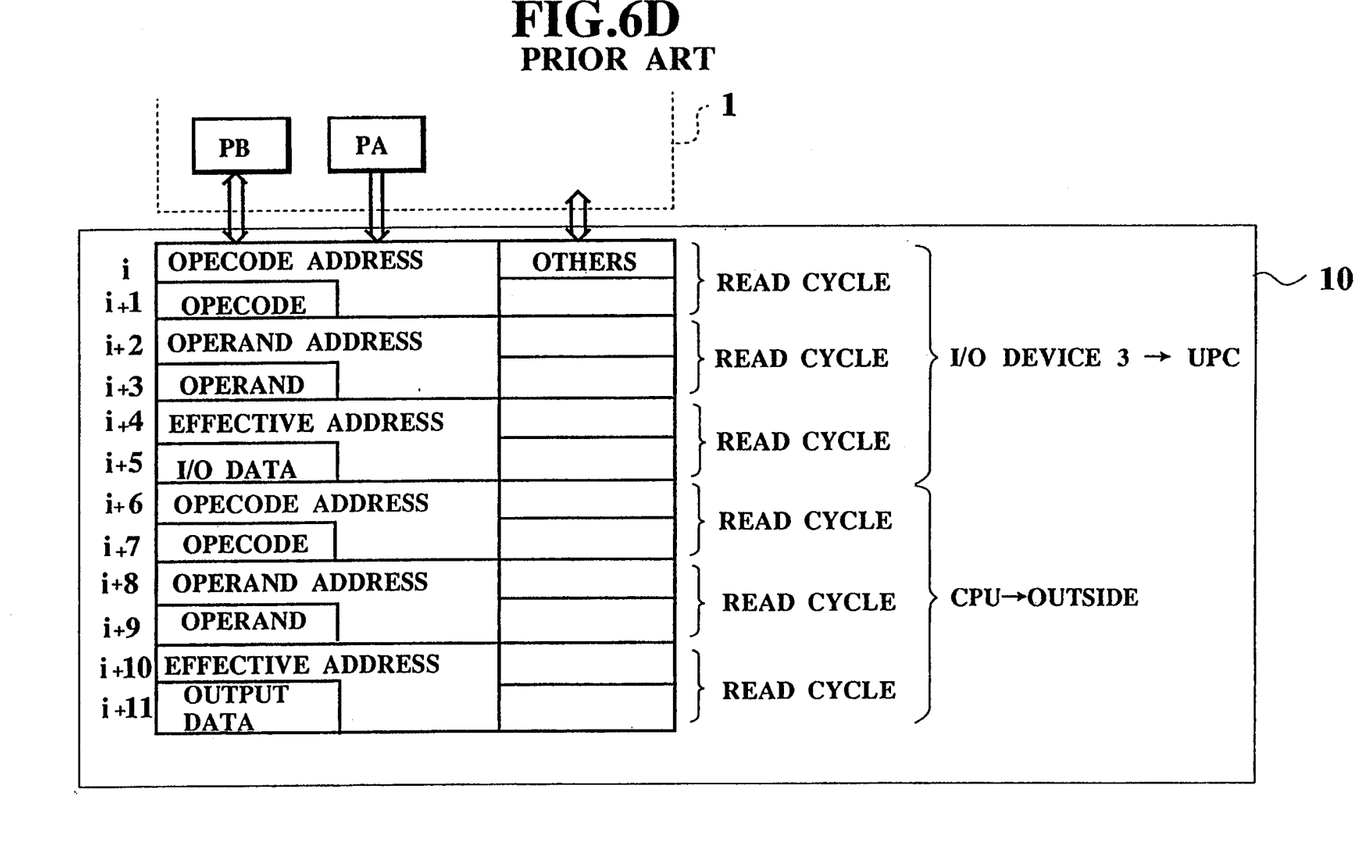
FIG. 6D is a schematic diagram of test vectors required for the conventional data processing device, as shown in FIG. 1, in the test operation mode.

FIG. 6D shows the number of test vectors required for the test operations of the conventional data processing device in the prior art.

Figure 6E:
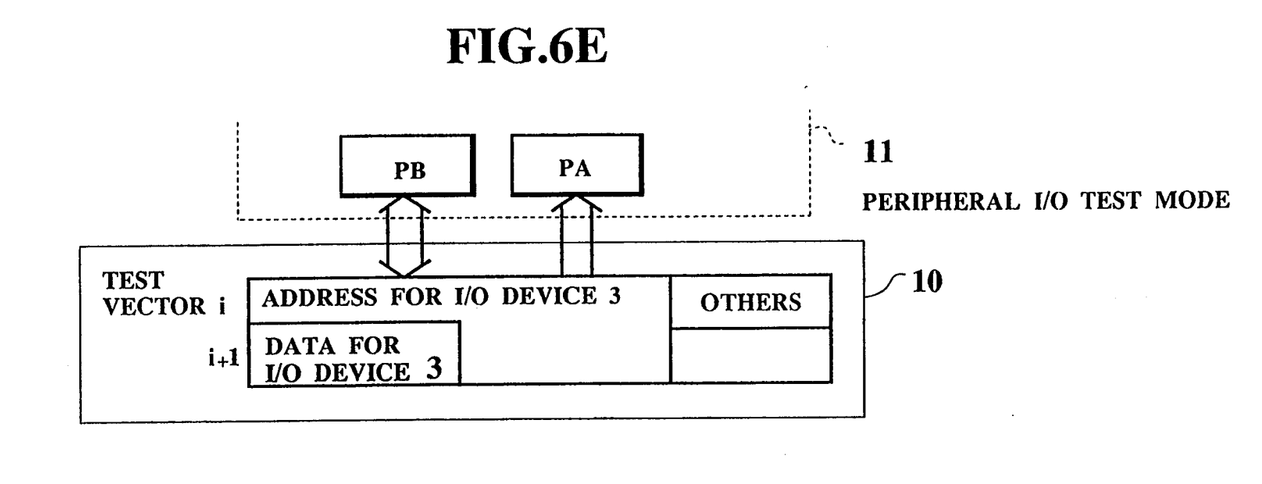
FIGS. 6E and 6F combined make up a schematic diagram of the test vectors required for the data processing device according to the present invention.
Figure 6F:
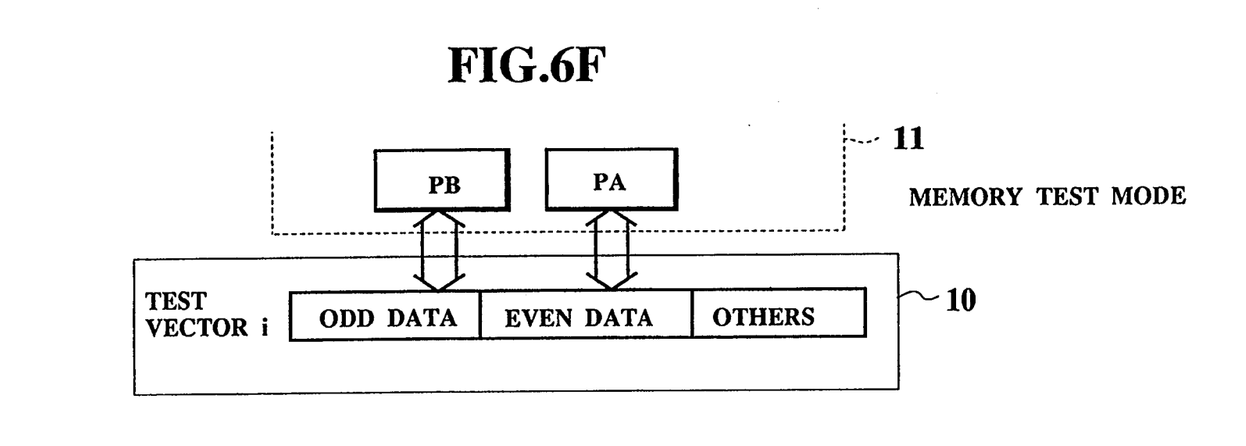

FIGS. 6E and 6F shows the number of test vectors required for the test operations such as the peripheral test mode and the memory test mode.

In the test operations for the I/O device 3 in the data processing device In the prior art, the contents of the I/O device S are transferred to the CPU 16, then further transferred to the LSI tester 10.

Accordingly, as shown in FIG. 6D, twelve (12) test vectors are required for the test operations.

On the other hand, only two test vectors are needed in the peripheral test mode in the data processing device according to the present invention because data in the I/O device 3 can be read and written in one cycle, as shown in FIG. 6E.

One test vector is needed in the memory test mode in the data processing device according to the present invention because an address in the I/O device 3 can be read and written in one cycle and the next target address in the I/O device 3 is set automatically in accordance with the NOP instructions transferred continuously from the CPU 16, as shown in FIG. 6E. Moreover, as shown in FIG. 6F, two bytes of data in the I/O device 3 are tested by one test vector because the addresses in the I/O device 3 are divided into two groups, the odd address group and the even address group, which can be transferred to the ports PA and PB, respectively.

As all of the addresses in the I/O device 3 to be tested are automatically designated by the NOP instructions which are transferred to the CPU 16 in the data processing device according to the present invention, as described above, no address can be set for the test operation by using the test vectors.

Accordingly, the number of test vectors to be used in the test mode and the test time of the test operations can be reduced by the present invention.

Various modifications will become possible for those skilled in the art after the teaching of the present disclosure without departing from the scope thereof.

What is claimed is:

1. A data processing device with a test control circuit, comprising:
   a central processing unit (CPU);
   a plurality of peripheral devices, an address bus and a data bus through which the CPU is connected to the peripheral devices;

input/output control means for controlling transfer of data input/output and an address signal between the address bus and the data bus and an external device; and test control means for isolating the data bus from the CPU in a test mode of the device and for controlling the input/output operation of the peripheral devices, the operation of the input/output control means and the operation of the CPU, wherein the test control means provides an instruction during the test mode to said CPU, by the instruction a predetermined address which is the first address in a peripheral device to be tested is preset, then a next target address to be tested is transferred continuously to the peripheral device from the CPU based on the preset address.

2. A data processing device according to claim 1, wherein the device is formed on a single semiconductor chip.

3. A data processing apparatus as recited in claim 1, wherein data from said input/output devices is provided to a plurality of ports.

4. A data processing apparatus as recited in claim 1, wherein data from said input/output devices is provided to a plurality of ports.

5. A data processing apparatus as recited in claim 1, wherein a next target address to be tested is transferred from the CPU to the peripheral device by executing a NOP instruction in the CPU, thereby incrementing a program counter in the CPU so that successive addresses are provided to the peripheral device over an internal bus.

* * * * *